Nov. 10, 1931.                J. R. RICHER                1,831,577
SPEED CHANGE MECHANISM
Filed Sept. 6, 1930
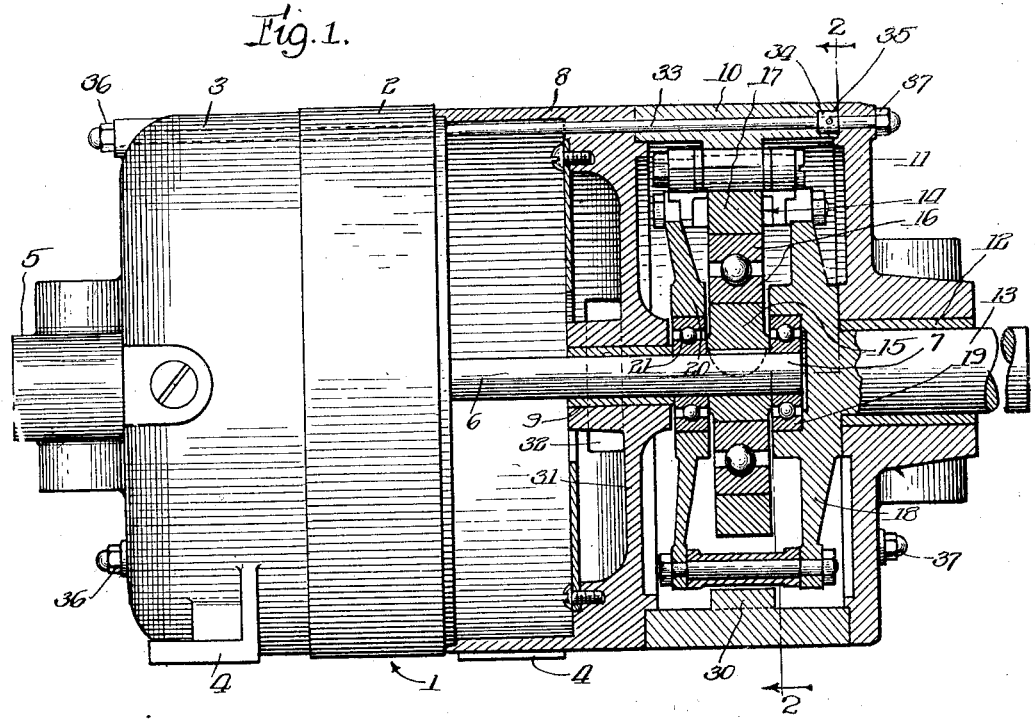
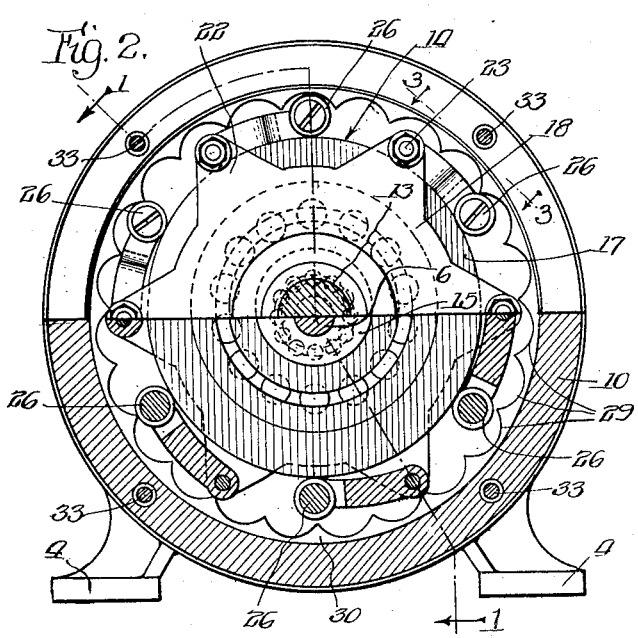
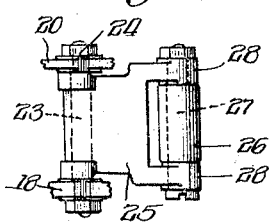
Inventor:
Joseph R. Richer Patented Nov. 10, 1931

1,831,577

UNITED STATES PATENT OFFICE

JOSEPH R. RICHER, OF OAK PARK, ILLINOIS

SPEED CHANGE MECHANISM

Application filed September 6, 1930. Serial No. 480,063.

The invention relates generally to speed change mechanisms and more particularly to a speed reducing mechanism of novel and compact construction.

The general object of the invention is to provide a new and improved speed change mechanism which is simple in construction and efficient in operation.

Another object is to provide an improved speed change mechanism embodying rolling contacts exclusively so as to eliminate friction between parts.

A further object is to provide a novel speed change mechanism compact in construction so that it can be readily mounted on one end of a fractional horse-power electric motor.

Fig. 1 is an elevational view, partly in section along the line 1—1 of Fig. 2, of a preferred form of the invention applied to a fractional horse-power motor.

Fig. 2 is a transverse section approximately along the line 2—2 of Fig. 1.

Fig. 3 is a fragmentary view approximately along the line 3—3 of Fig. 2.

While I have shown in the drawings and shall herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

In the form chosen for purposes of disclosure the invention is illustrated in connection with an electric motor 1 having a stator frame 2. An end bell or housing 3 is secured to one end of the stator frame and is provided with suitable feet 4. This housing also has a bearing designated generally as 5 for one end of a rotor shaft 6, the other end of which normally extends through a similar housing on the other end of the stator frame and has a projecting end 7 adapted to receive a pulley or coupling device. In combining the preferred form of my invention with such a motor however, a special housing 8 is substituted on the pulley end of the stator frame 2, this housing also having feet 4 and a bearing 9 for the driving end of the shaft, the normal pulley shaft extension 7 extending beyond said bearing as indicated clearly in Fig. 1 to provide a driving means for the speed change mechanism.

The speed change mechanism is herein disclosed positioned within a tubular casing 10 which is secured to the housing 8, and an end plate or closure 11 which closes the outer end of the casing and has a bearing 12 in which a driven shaft 13 is rotatably mounted in axial alinement with the driving shaft 6.

As illustrated in the drawings the mechanism connecting the driving shaft 6 and the driven shaft 13 embodies an eccentric device 14 on the driving shaft which eccentric device comprises an eccentric 15 connected to the shaft 6, a ball bearing 16 having its inner race secured to the eccentric and a ring 17 secured to the outer race. Thus the ring 17 which forms the periphery of the eccentric device is freely rotatable relative to the driving shaft 6.

The driven shaft 13 preferably has a portion or member 18 formed integrally with its inner end, a ball bearing 19 being positioned with its inner race on the adjacent end of the driving shaft 6 and its outer race secured in a recess in the portion 18. A somewhat similar member 20 is mounted in spaced relation to the portion 18 longitudinally of the shaft 6 and is supported rotatably on said shaft by a ball bearing 21. The members 18 and 20 as disclosed herein have a plurality of outwardly extending arms 22, corresponding arms of the two members being connected by headed pivot pins 23 having nuts 24 thereon. On each pivot pin 23 is hinged a link 25 shown in detail in Fig. 3, the free end of each link carrying a roller 26 which is rotatably supported on a pin 27 secured between arms 28 on the link.

The rollers 26 as shown most clearly in Fig. 2, run on the ring 17 of the eccentric device and during operation of the mechanism are adapted to roll into and out of a plurality of depressions 29 forming an internal toothed device on an inwardly extending flange 30 of the casing 10. In the exemplary form of the invention the depressions have substantially cylindrical surfaces with a radius approximately fifty percent greater than the diameter of the rollers 26, there being six rollers and twenty-three depressions. Thus the depressions equal in number, an even number times the number of rollers, minus one, to provide a speed ratio of 23 to 1 between the shafts 6 and 13.

The pivoted links serve as a means for mounting the rollers movably on the driven member and operate to constrain the driven member to move with the rollers through their generally circular path. As the driving shaft operates the eccentric device rolls the rollers into and out of the depressions and over the teeth formed between the depressions and since the driven shaft is thereby turned through one depression for each complete revolution of the eccentric device it is evident that the driven shaft will rotate at one twenty-third the speed of the driving shaft and in the same direction as the driving shaft.

The housing 8 as illustrated herein has an end wall 31 and is provided with a plurality of air ducts 32 so as to permit proper ventilation of the motor. The parts 2, 3, 8 and 10 are fastened together by a plurality of longitudinally extending bolts 33 having collars 34 pinned thereto and fitting into recesses 35 in the casing 10, suitable nuts 36 being provided on the other ends to secure the parts 2, 3, 8 and 10 together. These bolts project through apertures in the closure 11 and receive nuts 37 for securing the closure to the casing. Thus when the nuts 37 are removed it is possible for an operator to inspect or remove the speed change mechanism without taking apart the motor.

I claim as my invention:

1. A speed changing mechanism comprising a tubular casing adapted to be secured to the pulley end of a motor frame and having a closure for the outer end thereof, a driven member rotatably mounted in said closure and having a recess in its inner end carrying a ball bearing for the adjacent end of the motor shaft, and means for driving the driven member from the shaft of the motor and in the same direction of rotation comprising a plurality of longitudinally extending circumferentially spaced pivot pins on the inner end of said driven member, links hinged on said pivot pins and having rollers on their free ends, means within said casing having teeth formed by substantially cylindrically surfaced depressions and over which said rollers operate and an eccentric adapted to be supported on and driven by the shaft of the motor for moving said rollers over said teeth.

2. A speed change mechanism comprising, in combination, a casing, driving and driven members rotatably mounted in axial alinement in said casing, a plate secured to the inner end of the driven member and carrying a plurality of longitudinally extending circumferentially spaced pivot pins, a second plate rotatably mounted on the driving shaft and connected to the free ends of said pins, an eccentric device on said driving shaft intermediate said plates, an internal ring gear surrounding said eccentric device outside of said pins, a plurality of links hinged on said pivot pins and rollers on said links operable over the teeth of said gear by said eccentric device.

3. A speed change mechanism comprising, in combination, a casing, driving and driven members rotatably mounted in axial alinement in said casing, a plurality of longitudinally extending circumferentially spaced pivot pins on the inner end of said driven member, a plurality of links hinged on said pivot pins, an internal toothed device, rollers on said links operable over the teeth of said device, and means on said driving member operable to roll said rollers over said teeth.

4. A speed change mechanism comprising, in combination, a casing, driving and driven members rotatably mounted in axial alinement in said casing, means on the inner end of the driven member carrying a plurality of longitudinally extending circumferentially spaced pivot pins, an eccentric device on said driving shaft, a stationary toothed device surrounding said eccentric device outside of said pins, a plurality of links hinged on said pivot pins and rollers on said links operable over the teeth on said device by said eccentric device.

5. A speed change mechanism comprising, in combination, a casing, driving and driven members rotatably mounted in axial alinement in said casing, and means for driving said driven member in the same direction as the driving member comprising an eccentric device on said driving member, a plurality of circumferentially spaced longitudinally extending pivot pins secured to the inner end of said driven member, links mounted on said pivot pins carrying rollers at their free ends operable on said eccentric device and an internal toothed device having a plurality of substantially cylindrically surfaced depressions between teeth over which said rollers operate.

6. A speed change mechanism comprising, in combination, a casing, driving and driven members rotatably mounted in axial alinement in said casing, and means for driving said driven member in the same direction as the driving member comprising an eccentric device on said driving member, a plurality of circumferentially spaced longitudinally extending rollers disposed about the axis of said shafts, means movably mounted on said driven member and carrying said rollers for movement substantially radially of said driven member for operation of the rollers on said eccentric device, and an internal toothed device having a plurality of substantially cylindrically surfaced depressions between teeth over which said rollers operate.

In testimony whereof, I have hereunto affixed my signature.

JOSEPH R. RICHER.